United States Patent [19]

Daimon et al.

[11] Patent Number: 4,891,264

[45] Date of Patent: Jan. 2, 1990

[54] ELECTROCONDUCTIVE THERMOPLASTIC RESIN SHEET

[75] Inventors: Takashi Daimon; Hideshi Sakamoto; Osamu Akimoto, all of Ichiharashi, Japan

[73] Assignee: Chisso Corporation, Japan

[21] Appl. No.: 284,726

[22] Filed: Dec. 15, 1988

[30] Foreign Application Priority Data

Jan. 5, 1988 [JP] Japan .................................. 63-542
Jan. 11, 1988 [JP] Japan .................................. 63-3515

[51] Int. Cl.$^4$ ................................................ B32B 9/00
[52] U.S. Cl. ....................................... 428/246; 427/35; 427/58; 427/389.9; 428/253; 428/254; 428/262; 428/254; 428/286; 428/296; 428/922
[58] Field of Search ............... 428/296, 246, 284, 286, 428/290, 253, 254, 262, 922; 427/35, 58, 389.9

[56] References Cited

FOREIGN PATENT DOCUMENTS 58-155917 9/1983 Japan .
58-166035 10/1983 Japan .

Primary Examiner—James J. Bell
Attorney, Agent, or Firm—Ledig, Voit & Mayer

[57] ABSTRACT

An electroconductive thermoplastic resin sheet causing no fluffing of electroconductive fibers is provided, which sheet comprises
  a thermoplastic resin film;
  a non-woven fabric or a knitted or woven fabric consisting of hot-melt-adhesive fibers and electroconductive fibers and applied and integrally melt-adhered onto one surface or both the surfaces of the film and then subjected to surface treatment; and
  a coating having a curing composition composed mainly of an unsaturated resin and a reactive diluent applied onto the treated surface and crosslinked and cured and having a coating thickness of 1 to 10 μm.

8 Claims, No Drawings

ELECTROCONDUCTIVE THERMOPLASTIC RESIN SHEET

BACKGROUND OF THE INVENTION

1. Field of the Invention

This invention relates to a thermoplastic resin sheet having electrical conductivity on the surface thereof.

2. Description of the Related Art

Processes for making thermoplastics electroconductive include a process of blending an antistatic agent with thermoplastics or applying the agent on the surface of the thermoplastic molded product and a process of blending carbon black as an electroconductive material with thermoplastics. However, in the case of the former process, the surface resistivity of the resulting product is at most about $10^9 \Omega/\square$ and yet there are drawbacks that the surface resistivity changes due to the ambient humidity; the antistatic effect is lost with lapse of time; etc. Further, in the case of the latter process, unless the more continuously the carbon black particles are present inside the thermoplastic resin sheet, the more the quantity thereof blended is increased, the aimed electrical conductivity cannot be obtained. However, if a large quantity of carbon black is blended, there are drawbacks that the mechanical strength of the molded product is notably reduced and the processability of the thermoplastic resin becomes inferior.

As electroconductive thermoplastic resin sheets solving the above-mentioned so far raised problems, an electroconductive thermoplastic resin sheet having a non-woven fabric consisting of electroconductive fibers and hot-melt-adhesive fibers (hereinafter referred to as electroconductive non-woven fabric) melt-adhered onto a thermoplastic resin sheet as a substrate is disclosed in Japanese patent application laid-open No. Sho 58-155917/1983, and an electroconductive thermoplastic resin sheet having a knitted or woven fabric consisting of electroconductive fibers and hot-melt-adhesive fibers melt-adhered onto and integrated with a thermoplastic resin sheet as a substrate is disclosed in Japanese patent application laid-open No. Sho 58-166035/1983.

However, electroconductive thermoplastic resin sheets obtained according to these processes have drawbacks that merely by slightly abrading the surface of the sheets by nails, clothes, etc., a portion of the electroconductive fibers present on the surface layer thereof peels off from the substrates to cause fluffing. Such a fluffing phenomenon not only makes the appearance of the electroconductive thermoplastic resin sheet inferior, but also when the sheets are strongly abraded, electroconductive fibers peel off from the sheets to contaminate the environment and further deteriorate the electroconductive performance; hence these facts have been becoming a serious obstacle to practical use of such sheets.

SUMMARY OF THE INVENTION

The present inventors have made extensive research in order to solve the above-mentioned problem i.e. fluffing of such electroconductive thermoplastic resin sheets. As a result, we have found that an electroconductive thermoplastic resin sheet obtained by forming a crosslinked and cured coating of 1 to 10 μm thick composed mainly of an unsaturated resin and a reactive diluent on the surface layer of an electroconductive plastic resin sheet having an electroconductive non-woven fabric melt-adhered onto a thermoplastic resin sheet can prevent electroconductive fibers from fluffing without reducing electroconductive performance, and have achieved the present invention based on the above-mentioned finding.

The present invention has the following constitutions:

(1) an electroconductive thermoplastic resin sheet comprising a thermoplastic resin film;
   a non-woven fabric consisting of hot-melt-adhesive fibers and electroconductive fibers irregularly entangled with each other and applied and integrally melt-adhered onto one surface or both the surfaces of said film and then subjected to surface treatment; and
   a coating having a curing composition composed mainly of an unsaturated resin and a reactive diluent applied onto the treated surface and crosslinked and cured and having a coating thickness of 1 to 10 μm;

(2) an electroconductive thermoplastic resin sheet according to item (1) wherein said surface treatment is corona discharge treatment;

(3) an electroconductive thermoplastic resin sheet according to item (1) wherein said curing of said curing composition is carried out by means of electron beams;

(4) an electroconductive thermoplastic resin sheet according to item (1) wherein said electroconductive fibers are carbon fibers, stainless steel fibers, carbon composite synthetic fibers, carbon-coated synthetic fibers, aluminum or aluminum alloy fibers, aluminum-coated synthetic fibers, aluminum-coated carbon fibers or mixtures of at least two members of the foregoing;

(5) an electroconductive thermoplastic resin sheet comprising
   a thermoplastic resin film;
   a knitted or woven fabric consisting of hot-melt-adhesive fibers and electroconductive fibers and applied and integrally melt-adhered onto one surface or both the surfaces of said thermoplastic resin film and subjected to surface treatment; and
   a coating having a curing composition composed mainly of an unsaturated resin and a reactive diluent applied onto the treated surface and crosslinked and cured and having a coating thickness of 1 to 10 μm;

(6) an electroconductive thermoplastic resin sheet according to item (5) wherein said surface treatment is corona-discharge treatment;

(7) an electroconductive thermoplastic resin sheet according to item (5) wherein said curing means is electron beams; and (8) an electroconductive thermoplastic resin sheet according to item (5) wherein said electroconductive fibers are carbon fibers, stainless steel fibers, carbon composite synthetic fibers, carbon-coated synthetic fibers, aluminum or aluminum alloy fibers, aluminum-coated synthetic fibers, aluminum-coated carbon fibers or mixtures of at least two members of the foregoing.

DETAILED DESCRIPTION OF PREFERRED EMBODIMENTS

Examples of the thermoplastic resin for the thermoplastic resin film used in the present invention are polyolefin resins such as polyethylene, polypropylene, ethylene-vinyl acetate copolymer, ethylene-ethyl acrylate copolymer, etc.; styrene resins such as polystyrene, acrylonitrile-butadiene-styrene copolymer, acrylonitrilestyrene copolymer, etc.; acrylic resins such as polymethyl methacrylate, etc.; polyamide resins such as 6-nylon, 66-nylon, 12-nylon, 6.12-nylon, etc.; polyester resins such as polyethylene terephthalate, polybutylene terephthalate, etc.; polyvinyl chloride, polycarbonates, polyphenylene oxides and mixtures of the foregoing.

With these resins may be blended various additives such as heat stabilizer, weathering stabilizer, plasticizer, lubricant, slip agent, antistatic agent, charge-transfer type polymer, nucleating agent, fire retardant, tackifier (petroleum resin, etc.), pigment, dye, inorganic filler, organic filler, etc. depending on the object.

Further, examples of hot-melt-adhesive fibers used for electroconductive non-woven fabrics and electroconductive knitted or woven fabrics are acrylic fibers, polyamide fibers, polyester fibers, polyolefin fibers, polyvinyl chloride fibers and mixtures of the foregoing, and these fibers have no particular limitation as far as they can be melt-adhered onto the thermoplastic resin film as substrate. If necessary, with these fibers may be blended fire-retardant, coloring agent, antistatic agent, charge-transfer type polymer, etc.

As to the hot-melt-adhesive fibers, those having a fiber diameter of about 0.5 to 10 d are preferably used. Further, as to the hot-melt-adhesive fibers constituting the non-woven fabric, those having a fiber length of about 5 to 100 mm are preferred.

Next, examples of the electroconductive fibers are composite synthetic fibers with metals or metal compounds, synthetic fibers coated by metals or metal compounds, glass fibers coated by metals or metal compounds, carbon fibers coated by metals or metal compounds, composite synthetic fibers with carbon, synthetic fibers coated by carbon, carbon fibers, metal fibers, etc. and mixtures of the foregoing. Further, in the present invention, in order to fortify adhesion of the crosslinked and cured coating onto the surface of the electroconductive thermoplastic resin sheet, it is necessary to subject the surface of the electroconductive thermoplastic resin sheet to surface treatment to thereby enhance the wetting tension of the surface. As the surface treatment process, corona discharge treatment is generally employed, but when the corona discharge treatment is carried out in the atmosphere, some electroconductive fibers lose their electrical conductivity in the oxidation reaction by way of corona discharge; hence caution against this is needed. In addition corona discharge treatment in an inert gas atmopshere is also possible, but such a treatment is not practical since a number of problems are raised in the aspects of operational safety, furnishments, etc.

When the corona discharge treatment is carried out in the atmosphere, it is preferred to use electroconductive fibers causing no reduction in the electrical conductivity such as carbon fibers, stainless steel fibers, composite synthetic fibers with carbon, synthetic fibers coated by carbon, aluminum or aluminum alloy fibers, synthetic fibers coated by aluminum, glass fibers coated by aluminum, carbon fibers coated by aluminum or mixtures of at least two members of the foregoing.

As to the electroconductive fibers, those having a fiber diameter of about 1 to 30 μm are preferably used and as to the electroconductive fibers constituting the non-woven fabric, those having a fiber length of about 5 to 100 μm are preferred.

Further, besides the above-mentioned hot-melt-adhesive fibers and electroconductive fibers, fibers having high melting points or fibers exhibiting no melting properties may be blended with the electroconductive non-woven fabric or electroconductive knitted or woven fabric of the present invention.

The electroconductive non-woven fabric may be prepared from the above-mentioned hot-melt-adhesive fibers and electroconductive fibers according to known processes such as binder process, needle-punching process, a process of water-pressure entangling by way of spun bonding, heat adhesion process, wet making process, etc., and those having a basis weight of 100 g/m² or less are preferably used.

Further, the electroconductive knitted or woven fabric of the present invention may be prepared according to known processes such as a process of mix-spinning cut fibers of the above-mentioned hot-melt-adhesive fibers and electroconductive fibers to prepare spun yarns and weaving the spun yarns as at least one of warp yarns or weft yarns to obtain a woven fabric, a process of weaving filament yarns of the hot-melt-adhesive fibers and filament yarns of the electroconductive fibers to obtain a woven fabric, a process of weaving yarns obtained by twisting the hot-melt-adhesive fibers and the electroconductive fibers together to obtain a woven fabric, a process of knitting spun yarns, filament yarns or twisted yarns as described above to obtain a knitted fabric or lace, etc., and those having a basis weight of 200 g/m² or less are preferred.

The proportion of the electroconductive fibers used for preparing the electroconductive non-woven fabric or electroconductive knitted or woven fabric of the present invention is 1 to 99% by weight, preferably 3 to 70% by weight, more preferably 10 to 60% by weight based upon the weight of the electroconductive non-woven fabric or the knitted or woven fabric.

If the proportion of the electroconductive fiber exceeds 99% by weight, preparation of the electroconductive non-woven fabric is not only difficult, but also adhesion thereof onto the thermoplastic resin film is insufficient, while if it is less than 1% by weight, it is impossible to impart a good electrical conductivity.

Examples of the unsaturated resin constituting the main component of the curing composition are epoxy resins, polyester resins, polyurethane resins, polyamide resins, melamine resins, etc. and among these resins, those obtained by introducing acryloyl group into a polymer at the end or side chain thereof the backbone chain of which polymer is polyesters, epoxies, polyurethanes, polyethers, polyols, etc. having a high radiation-activity, such as polyester acrylates, polyepoxy acrylates, polyurethane acrylates, polyether acrylates, polyol acrylates, etc. are preferably used. These resins are used usually in the form of oligomers having a molecular weight of about 250 to 1,500 and the number of acryloyl groups per molecule is 2 to 5.

Further, examples of the reactive diluent are polyfunctional monomers such as trimethylolpropane triacrylate, pentaerythritol triacrylate, pentaerythritol tetraacrylate, ethylene glycol diacrylate, tetraethylene glycol diacrylate, polyethylene glycol diacrylate, 1,6-hexanediol diacrylate, neopentyl glycol diacrylate, triacryloxyethyl phosphate, etc., monofunctional monomers such as vinyl pyrrolidone, 2-hydroxyethyl (meth)acrylates, 2-hydroxypropyl (meth)acrylates, tetrahydrofurfuryl acrylate, butoxyethyl acrylate, ethyl diethylene glycol acrylate, 2-ethylhexyl acrylate, cyclohexyl acrylate, phenoxyethyl acrylate, 2-hydro-3-phenyloxypropyl acrylate, dicyclopentadiene acrylate, etc., and mixtures of at least two members of the foregoing.

To the curing composition may be added various kinds of additives, if necessary. Examples of these additives are various natural or synthetic high-molecular substances, fillers, pigments, dyes, delustrants, plasticizers, viscosity modifiers, solvents, and other auxiliaries, etc.

Examples of the above-mentioned high-molecular substance are various polymers, copolymers, prepolymers, oligomers containing saturated or unsaturated groups and belonging to (meth)acrylic compound, urethane, butadiene, ethylene, vinyl chloride, vinylidene chloride, polyether, alkyd, polyester, polyamide, vinyl acetate, vinyl formal, vinyl butyral, vinylpyrrolidone, vinyl alcohol, etc., cellulose, its derivatives, rosin, its derivatives. phenol resins, their derivatives, petroleum resins, silicone resins, natural or synthetic oils and fats, waxes, etc.

Examples of the filler are fibers or powder of glass, metals or metal compounds, silica, barytes, calcium carbonate, etc.

Examples of the pigment are extender pigments such as alumina white, clay, talc, barium carbonate, barium sulfate, etc., inorganic pigments such as zinc white, lead white, yellow lead oxide, ultramarine blue, Prussian blue, titanium oxide, zinc chromate, red oxide, carbon black, etc., and organic pigments such as Brilliant Carmine 6B, Permanent Red R, Benzidine Yellow, Lake Red C, Phthalocyanine Blue, etc.

Examples of the dye are basic dyes such as magenta, rhodamine, etc., direct dyes such as Direct Scarlet, Direct Orange, etc., and acid dyes such as Roccelline, Metanyl Yellow, etc.

Examples of the delusterant are organic delustrants such as polyacrylonitrile powder, etc. and inorganic delustrants such as powdery silica or its modified substances, etc.

Examples of the plasticizer are dibutyl phthalate, dioctyl phthalate, chlorinated paraffin, tricresyl phosphate, etc.

Examples of the viscosity modifier are bentonite, silica gel, aluminum octoate, etc.

Examples of the solvent are various solvents belonging to ketones, alcohols, esters, ethers, aliphatic, alicyclic or aromatic hydrocarbons, etc.

Examples of the other auxiliaries are known defoamers, leveling agents, surfactants, UV absorbers, fire retardants, charge-transfer type polymers, etc.

Besides, in the case where the curing means utilizes mainly heat energy such as those generated by heat oven, infrared rays irradiation, microwave irradiation, etc., radical initiators such as ketone peroxides, hydroperoxides, dialkyl peroxides, diacyl peroxides, etc. may be used. In the case where curing is carried out at relatively low temperatures as in the case of normal temperature curing, it is preferred to use promotors together with the radical initiators, for example, to use a combination of ketone peroxides or diacyl peroxides with metal salts, a combination of ketone peroxides, diacyl peroxides or hydroperoxides with reducing amines. Further, in the case where the curing means is ultraviolet-rays irradiation, light initiators such as benzoin compounds such as benzoin, benzoin methyl ether, benzoin ethyl ether, benzoin propyl ether, benzoin butyl ether, benzoin octyl ether, etc., carbonyl-compounds such as benzil, diacetyl, methylanthraquinone, acetophenone, benzophenone, etc., sulfur compounds such as diphenyl disulfide, dithiocarbamate, etc., naphthalene compounds such as $\alpha$-chloromethylnaphthalene, etc., anthracene, metal salts such as iron chloride, etc. are used.

The electroconductive thermoplastic resin sheet of the present invention may be obtained e.g. according to the following process:

an electroconductive non-woven fabric or an electroconductive knitted or woven fabric is laminated onto a thermoplastic resin film as a substrate according to a known process such as extrusion-lamination process, heated roll contact-bonding process, heat press, etc. to integrate them by melt-adhesion. At that time it is necessary to choose a temperature condition under which the hot-melt-adhesive fibers constituting the electroconductive non-woven fabric or those blended with the electroconductive knitted or woven fabric are completely melted and integrated with the thermoplastic resin film as a substrate.

For example, in the case of extrusion-lamination process, a thermoplastic resin as the substrate is first melt-kneaded at a resin temperature of 180° to 280° C. in an extruder and extruded through a T-die in the form of a film, followed by overlaying an electroconductive non-woven fabric or knitted or woven fabric on one side surface or both the surfaces of the film and contact-bonding them by means of a pair of rolls heated to about 30° to 160° C., to integrate the substrate with the electroconductive non-woven fabric or knitted or woven fabric by melt-adhesion. At that time, in order to ease the integration of the electroconductive non-woven fabric or knitted or woven fabric with the substrate, a heat-resistant plastic film having a thickness of preferably about 10 to 50 $\mu$m such as biaxially stretched polyester film, teflon film, etc. may be further overlaid in contact with the electroconductive non-woven fabric or knitted or woven fabric, followed by melt-adhering them under pressure in such an overlaid state as it is, cooling and solidifying them and peeling off the heat-resistant plastic film to obtain the electroconductive thermoplastic resin sheet.

Further, in the case of heated roll contact-bonding process, a thermoplastic resin sheet is overlaid on an electroconductive non-woven fabric or knitted or woven fabric, followed by integrating them under pressure by means of heated rolls heated to 100° to 200° C.

The thickness of the electroconductive thermoplastic resin sheet may be optionally chosen within a range of 0.03 to 5.0 $\mu$m.

Next, in order to enhance its adhesion onto the curing composition, the surface of the electroconductive non-woven fabric or knitted or woven fabric on which the electroconductive thermoplastic resin sheet obtained according to the above-mentioned process is overlaid, is subjected to surface treatment. As the surface treatment, various known processes may be employed such as chemical treatment, coupling treatment, primer treatment (polymer coating), surface grafting, ultraviolet-ray irradiation treatment, plasma treatment (such as corona discharge treatment, glow discharge treatment, plasma jet treatment, etc.), plasma polymerization treatment, etc. Among these processes, it is most preferred to employ corona discharge treatment according to which continuous production is possible and which is superior in the general-purpose properties. In the case of the present invention, as the equipment for the corona discharge treatment, it is preferred to employ an equipment for treating electroconductors (since if a corona discharge treating equipment for insulant is employed, sparking or scorching occurs). Further, it is preferred to carry out the corona discharge treatment just after preparation of the above-mentioned electroconductive thermoplastic resin sheet.

The surface wetting tension of the surface-treated surface (measured according to ASTM-D-2578) is preferred to adjust so as to give 35 dyne/cm or more, preferably 38 dyne/cm or more.

Thereafter, the above-mentioned curing composition is further applied onto the surface-treated surface, followed by irradiating electron beams or the like to form a crosslinked and cured coating having a coating thickness of 1 to 10 $\mu$m on the surface-treated surface.

Examples of a coating means for the curing composition are blade coater, knife coater, roll coater (three-roll coater, direct coater, reverse roll coater, etc.) and besides, coaters of various print types such as screen, offset, gravure, letter press, flexographic printing, etc. In some case, a spray type coater may be employed.

The curing composition may be applied onto the whole surface of the electroconductive thermoplastic resin sheet (solid printing) or may be partly applied by means of a half tone screen.

The quantity of the curing composition applied onto the surface of the electroconductive thermoplastic resin sheet is preferred to adjust so as to adjust the coating thickness of the crosslinked and cured coating formed on the surface of the sheet, to a range of 1 to 10 $\mu$m, preferably 2 to 7 $\mu$m. If the coating thickness of the cured coating is less than 1 $\mu$m, it is impossible to completely prevent the fluffing of the electroconductive fibers from occurring, while if it exceeds 10 $\mu$m, the surface resistivity is higher than $10^{12} \Omega/\square$ so that the electroconductivity becomes inferior.

As a curing means for the curing composition, normal temperature curing, means utilizing mainly heat energy such as heating oven, infrared ray irradiation, microwave irradiation, etc., ultraviolet ray irradiation, irradiation by means of ionizing radiation such as electron beams, $\gamma$-rays, etc. are exemplified, but among these, electron beam irradiation is preferred in the aspects of productivity (curing time), slight deterioration of the thermoplastic resin film as a substrate due to heating, etc.

The electron beam irradiation is carried out by means of an electron beam accelerator according to scanning beam process or curtain beam process in $N_2$ gas atmosphere ($O_2$ concentration: 400 ppm or less).

The curing conditions of the coating are as follows: electron beam voltage, 125 to 300 KV and amount of radiation, about 1 to 20M rad.

The present invention will be described in more detail by way of Examples and Comparative examples, but it should not be construed to be limited thereto.

In addition, the measurement methods employed in Examples and Comparative examples are as follows:
(1) melt flow rate according to ASTM D-1238 (temperature 230° C. and load 2.16 Kg);
(2) high melt flow rate according to ASTM D-1238 (temperature 230° C. and load 10.2 Kg);
(3) isotactic pentad ratio measured based on Macromolecules, 8, 687 (1975), the ratio being an isotactic ratio in terms of pentad units in polypropylene molecular chain, using $^{13}$C-NMR; and
(4) surface resistivity ($\Omega/\square$)
  A. computing digital multimeter, TR 6877 manufactured by Takeda Riken Co., Ltd. and
  B. high resistor, STACK TR-3 manufactured by TOKYO ELECTRONIC Co., Ltd., electrode: circular electrode (anode: disk of 70 mm$\phi$ in outer diameter, cathode: ring form, outer diameter 110 mm$\phi$, inner diameter 80 mm$\phi$) were employed.

Only in the case where the observed values are $10^7 \Omega$ or more, B was employed Surface resistivity=15-$\pi \times$observed value ($\Omega$).

EXAMPLE 1

An electroconductive non-woven fabric having a basis weight of 10 g/m$^2$ was obtained from 95% by weight of low melting polypropylene fibers (m.p. 128° C.) having a fiber diameter of 2 d and a fiber length of 51 mm and 5% by weight of pitch carbon fibers (manufactured by DONAC Co., Ltd.) having a fiber diameter of 13 $\mu$m and a fiber length of 40 mm according to heat-melt adhesion process.

Next, polypropylene pellets obtained from a blend of a highly crystalline propylene homopolymer having an isotactic pentad ratio (P) of 0.968, a melt flow rate (MFR) of 0.53 g/10 min and a high melt flow rate (HMFR) of 23.5 g/10 min, with 0.10% by weight of 1,3,5-trimethyl-2,4,6-tris(3,5-di-t-butyl-4-hydroxybenzyl)benzene, 0.10% by weight of tetrakis[methylene(3,5-di-t-butyl-4-hydroxy-hydrocinnamate)]methane and 0.05% by weight of calcium stearate were melt-kneaded by means of an extruder having a bore diameter of 65 mm and extruded through a T-die of 600 mm wide in the form of film at a resin temperature of 240° C.

On both the surfaces of the resulting film were overlaid the above-mentioned electroconductive non-woven fabric (two sheets in total), followed by integrally contact-bonding the substrate with the electroconductive non-woven fabrics by means of a pair of a touch roll (metal roll) of 200 mm in diameter into which hot water at 80° C. was passed and a chill roll (metal roll) of 500 mm in diameter to obtain an electroconductive polypropylene sheet of 0.8 mm thick. In addition, at this step, a biaxially stretched polyester film of 12 $\mu$m thick was inserted onto the surface of the electroconductive non-woven fabric on the side of the touch roll, followed by cooling the resulting electroconductive polypropylene sheet and then peeling off the polyester film. The electroconductive polypropylene sheet at that time had a surface resistivity of $10^4$ to $10^5 \Omega/\square$ on both the surfaces thereof.

Next, both the surfaces of the electroconductive polypropylene sheet were subjected to corona discharge treatment by means of a corona discharge treatment equipment for electroconductors in the atmosphere. Both the surfaces thereof had a wetting tension of 41 dyne/cm. Further, the surface resistivity of the electroconductive polypropylene sheet after the corona discharge treatment was $10^4$ to $10^5 \Omega/\square$ on both the surfaces, that is, entirely unchanged from the value before the corona discharge treatment.

Further, as the curing composition, there was prepared a mixture composition consisting of 42% by weight of a polyepoxy acrylate oligomer, 55% by weight of 2-hydroxypropyl acrylate, 2% by weight of a betaine surfactant and 1% by weight of a polymerization inhibitor.

The above composition was applied onto the whole surface (one side surface) of the above electroconductive polypropylene sheet by means of a gravure roll, followed by irradiating electron beams onto the resulting material by means of an electron curtain conveyor type electron beam irradiation equipment (ELECTRON EPZ-2 Type (trademark of product manufactured by ESI Co., Ltd.), in $N_2$ atmosphere ($O_2$ concentration: 200 ppm) at an accelerated voltage of 140 KV and in an amount of radiation of 6M rad to form a crosslinked and cured coating of 3 μm thick. Similarly, a crosslinked and cured coating of 3 μm thick was formed on the other surface. No fluffing of the electroconductive fibers was observed on both the surfaces, and yet even when the surfaces were strongly rubbed by cloth, nails, etc., no fluffing of the electroconductive fibers occurred.

Further, both the surfaces of the electroconductive conductive polypropylene sheet after formation of the crosslinked and cured coating had a good electrical conductivity (surface resistivity: $10^4$ to $10^5 \Omega/\square$).

EXAMPLE 2

An electroconductive non-woven fabric having a basis weight of 10 g/m$^2$ was obtained from 85% by weight of polyvinyl chloride fibers (Teviron, trademark of product made by Teijin, Ltd.) having a fiber diameter of 2 d and a fiber length of 51 mm and 15% by weight of austenite stainless steel fibers (NASLON®, trademark of product made by NIPPON SEISEN Co., Ltd.) having a fiber diameter of 8 μm and a fiber length of 50 mm, using an acrylic resin as a binder.

Next, a polyvinyl chloride compound obtained by blending 100 parts by weight of a polyvinyl chloride having an average polymerization degree of 1,300 with 3.0 parts by weight of dioctyl phthalate, 2.5 parts by weight of a dibutyltin alkyl maleate, 0.5 part by weight of butyl stearate, 0.4 part by weight of stearyl alcohol and 0.1 part by weight of stearic acid was melt-kneaded by means of an extruder having a bore diameter of 65 mm and extruded through a T-die of 500 mm wide at a resin temperature of 185° C. in the form of film.

On both the surfaces of the resulting resin film was overlaid the above-mentioned electroconductive non-woven fabric, followed by integrally contact-bonding the substrate to the electroconductive non-woven fabric by means of a pair of a touch roll (metal roll) of 200 mm in diameter into which hot water at 70° C. was passed and a chill roll (metal roll) of 400 mm in diameter to obtain an electroconductive polyvinyl chloride sheet of 0.5 mm thick. In addition, at this step, onto the surface of the electroconductive non-woven fabric on the side of the touch roll was inserted a biaxially stretched polyester film of 12 μm thick, followed by cooling the resulting electroconductive polyvinyl chloride sheet and peeling off the polyester film. Both the surfaces of the electroconductive polyvinyl chloride sheet at that time had a surface resistivity of $10^3$ to $10^4 \Omega/\square$.

Next, both the surfaces of the above-mentioned polyvinyl chloride sheet were subjected to corona discharge treatment by means of a corona discharge treatment equipment for electroconductors in the atmosphere. Both the surfaces had a wetting tension of 43 dyne/cm. Further, both the surfaces of the electroconductive polyvinyl chloride sheet after corona discharge treatment had a surface resistivity of $10^3$ to $10^4 \Omega/\square$, that is, entirely unchanged from the values before the corona discharge treatment.

Further, as the curing composition, there was prepared a mixed composition consisting of 48% by weight of a polyurethane acrylate oligomer, 45% by weight of neopentyl glycol diacrylate, 6% by weight of an extender pigment (alumina white) and 1% by weight of a polymerization inhibitor.

The composition was applied onto the surface one side surface) of the electroconductive polyvinyl chloride sheet by means of a gravure roll with a half tone screen (reticulate point area: 60%), followed by irradiating electron beams onto the resulting material by means of an electron curtain conveyor type electron beam irradiation equipment (ELECTRON EPZ-2 type, trademark of product manufactured by ESI Co., Ltd.) in $N_2$ atmosphere ($O_2$ concentration: 200 ppm) at an accelerated voltage of 160 KV in an amount of radiation of 12 M rad to form a crosslinked and cured coating of 7 μm thick. Similarly, a crosslinked and cured coating of 7 μm thick was also formed onto the other surface.

No fluffing of the electroconductive fibers was observed on both the surfaces, and yet even when the surfaces were strongly rubbed by cloth, nails, etc., no fluffing of the fibers occurred.

Further, both the surfaces of the electroconductive polyvinyl chloride sheet after formation of the crosslinked and cured coating had a good electrical conductivity (surface resistivity: $10^3$ to $10^4 \Omega/\square$).

EXAMPLE 3

An electroconductive non-woven fabric having a basis weight of 10 g/m$^2$ was prepared according to binder process from 90% by weight of acrylonitrilevinyl chloride copolymer fibers (Kanekaron SB® of product made by Kanegafuchi Chemical Industry Co., Ltd.) having a fiber diameter of 1.5 d and a fiber length of 51 mm and 10% by weight of austenite stainless steel fibers (NASLON®, product made by NIPPON SEISEN Co., Ltd.) having a fiber diameter of 8 μm and a fiber length of 50 mm, using an acrylic resin as a binder.

Next, a GP-PS resin (ESTYRENE G-32, trademark of product made by Nippon Steel Chemical Co., Ltd.) was melt-kneaded by means of an extruder having a bore diameter of 40 mm, followed by extruding the resulting material through a T-die of 300 mm wide, at a resin temperature of 230° C. in the form of film. On one side surface of the resulting resin film was overlaid the above-mentioned electroconductive non-woven fabric, followed by integrally contact-bonding the substrate to the electroconductive non-woven fabric by means of a pair of polishing rolls (metal rolls) in which hot water at 60° C. was passed to obtain an electroconductive polystyrene sheet of 0.3 mm thick. The surface of the electroconductive non-woven fabric laminated onto the electroconductive polystyrene sheet had a surface resistivity of $10^4 \Omega/\square$.

Next, the surface of the electroconductive non-woven fabric laminated onto the electroconductive polystyrene sheet was subjected to corona discharge treatment. The treated surface had a wetting tension of 39 dyne/cm. Further, the surface of the electroconductive non-woven fabric laminated onto the electroconductive polystyrene sheet after the corona discharge treatment had a surface resistivity of $10^4 \Omega/\square$, that is, entirely unchanged from that before the corona discharge treatment.

Further, as the curing composition, there was prepared a mixed composition consisting of 48% by weight of a polyurethane acrylate oligomer, 45% by weight of neopentyl glycol diacrylate, 6% by weight of an extender pigment (alumina white) and 1% by weight of a polymerization inhibitor.

The composition was applied onto the whole surface (one side surface) of the electroconductive non-woven fabric laminated onto the electroconductive polystyrene sheet by means of a gravure roll, followed by irradiating electron beams onto the resulting material by means of an electron curtain conveyor type electron beam irradiation equipment (EPZ-2 type) in $N_2$ atmosphere ($O_2$ concentration: 150 ppm) at an accelerated voltage of 140 KV and in an amount of radiation of 6 M rad to form a crosslinked and cured coating.

On the laminated surface of the electroconductive non-woven fabric having the crosslinked and cured coating formed thereon, no fluffing of the electroconductive fibers was observed, and yet even when the surface was strongly rubbed by cloth, nails, etc., no fluffing of the electroconductive fibers occurred. Further, the surface had a good electrical conductivity (surface resistivity: $10^4$ to $10^5 \Omega/\square$).

EXAMPLE 4

An electroconductive non-woven fabric having a basis weight of 10 g/m² was obtained from 75% by weight of acrylonitrile-vinyl chloride copolymer fibers (Kanekaron® SB) having a fiber of 1.5 d and a fiber length of 51 mm and 25% by weight of carbon-coated polyester fibers having a fiber diameter of 3 d and a fiber length of 51 mm, using an acrylic resin as a binder according to binder process.

Next, an ABS resin was melt-kneaded by means of an extruder having a bore diameter of 40 mm and extruded through a T-die of 300 mm wide at a resin temperature of 250° C. in the form of film.

On both the surfaces of the resulting resin film was overlaid the above-mentioned electroconductive non-woven fabric, followed by integrally contact-bonding the substrate to the electroconductive non-woven fabric by means of a pair of polishing rolls (metal rolls) in which hot water at 80° C. was passed to obtain an electroconductive ABS resin sheet of 1.0 mm thick. In addition, at this step, a biaxially stretched polyester film of 25 μm thick was inserted onto the surface of the electroconductive non-woven fabric on the touch roll side of the polishing rolls, followed by cooling the electroconductive ABS resin sheet and peeling off the polyester film. The surface resistivity of the electroconductive ABS sheet at that time was $10^5 \Omega/\square$ on both the surfaces.

Next, both the surfaces of the electroconductive ABS resin sheet were subjected to corona discharge treatment in the atmosphere by means of a corona discharge treatment equipment for electroconductors. The wetting tensions on the treated surfaces were both 40 dyne/cm. Further, the surface resistivities of the electroconductive ABS resin sheet after subjected to corona discharge treatment were both $10^5 \Omega/\square$, that is, entirely unchanged from those before the corona discharge treatment.

Further, as the curing composition, there was prepared a mixed composition consisting of a polyepoxy acrylate oligomer (54% by weight), 2-hydroxyethyl acrylate (45% by weight) and a polymerization inhibitor (1% by weight).

The mixed composition was applied onto the whole surface (one side surface) of the electroconductive non-woven fabric laminated onto the electroconductive ABS resin sheet by means of a gravure roll, followed by irradiating electron beams onto the above surface by means of an electron curtain conveyor type electron beam irradiation equipment (ELECTRON EPZ-2 type) in $N_2$ atmosphere ($O_2$ concentration: 200 ppm) at an accelerated voltage of 140 KV and in an amount of radiation of 6M rad to form a crosslinked and cured coating of 3 μm thick. Similarly, a crosslinked and cured coating of 3 μm thick was formed on the other surface.

As to the electroconductive ABS resin sheet having the crosslinked and cured coating formed thereon, no fluffing of electroconductive fibers was observed on both on the surfaces, and even when the surfaces were strongly rubbed by cloth, nails, etc., no fluffing of electroconductive fibers occurred. Further, the surfaces had a good electrical conductivity (surface resistivity: $10^5$ to $10^6 \Omega/\square$).

EXAMPLE 5

As the curing composition, there was prepared a mixed composition consisting of 64% by weight of a polyester polyacrylate, 30% by weight of a polyol polyacrylate, 5% by weight of trimethylolpropane triacrylate and 1% by weight of benzoyl peroxide.

The mixed composition was applied onto one side surface of an electroconductive polypropylene sheet same as that used in Example 1 (subjected to corona discharge treatment) by means of a bar coater, followed by heat treating the resulting material in an oven at 130° C. for 5 minutes to form a crosslinked and cured coating of 7 μm thick. Similarly, a crosslinked and cured coating of 7 μm thick was formed on the other surface.

No fluffing of electroconductive fibers was observed on both the surfaces, and even when the surfaces were strongly robbed by cloth, nails, etc., no fluffing of electroconductive fibers occurred.

Further, the electroconductive polypropylene sheet after formation of the crosslinked and cured coating had a good electrical conductivity on both the surfaces (surface resistivity: $10^4$ to $10^5 \Omega/\square$).

EXAMPLE 6

As the curing composition, there was prepared a mixed composition consisting of 43% by weight of a polyester polyacrylate, 40% by weight of a polyol polyacrylate, 15% by weight of trimethylolpropane triacrylate and 2% by weight of benzil.

The composition was applied onto one side surface of the electroconductive polyvinyl chloride sheet same as that used in Example 2 (subjected to corona discharge treatment) by means of a bar coater, followed by irradiating ultraviolet rays onto the surface to form a crosslinked and cured coating of 5 μm thick. Similarly, a crosslinked and cured coating of 5 μm thick was formed on the other surface.

No fluffing of electroconductive fibers was observed on both the surfaces, and even when the surfaces were rubbed by cloth, nails, etc., no fluffing of electroconductive fibers occurred.

Further, both the surfaces after formation of the crosslinked and cured coating had a good electrical conductivity (surface resistivity: $10^3$ to $10^4 \Omega/\square$).

COMPARATIVE EXAMPLE 1

Example 1 was repeated except that the coating thickness of the crosslinked and cured coating in Example 1 was changed to 15 μm, to obtain an electroconductive polypropylene sheet. No fluffing of electroconductive fibers was observed on both the surfaces and even when the surfaces were rubbed by cloth, nails, etc., no fluffing of electroconductive fibers occurred.

Whereas the surface resistivities of the electroconductive polypropylene sheet after formation of the crosslinked and cured coating were far inferior (surface resistivity: $10^{12}\Omega/\square$ or more); thus the sheet was difficultly regarded as electroconductive thermoplastic sheet.

COMPARATIVE EXAMPLE 2

An electroconductive polypropylene sheet in a state where no crosslinked and cured coating was formed in Example 1 was prepared and its surface resistivity was measured. The surface resistivity was good on both the surfaces ($10^3$ to $10^4\Omega/\square$), but when the surfaces were strongly rubbed by cloth, nails, etc., fluffing of electroconductive fibers occurred.

COMPARATIVE EXAMPLE 3

Example 2 was repeated except that the coating thickness of the crosslinked and cured coating in Example 2 was changed to 15 μm to obtain an electroconductive polyvinyl chloride sheet. This sheet was observed to have no fluffing of electroconductive fibers on both the surfaces, and even when the surfaces were strongly rubbed by cloth, nails, etc., no fluffing of electroconductive fibers occurred.

However, the surface resistivities of the electroconductive polyvinyl chloride sheet after formation of the crosslinked and cured coating were far inferior ($10^{12}\Omega/\square$ or more on both the surfaces); hence the sheet was difficultly regarded as electroconductive sheet.

COMPARATIVE EXAMPLE 4

An electroconductive polyvinyl chloride sheet having no crosslinked and cured coating formed in Example 2 was prepared and its surface resistivities were measured. The surface resistivities on both the surfaces were good ($10^3$ to $10^4\Omega/\square$), but when the surfaces were strongly rubbed by cloth, nails, etc., fluffing of the electroconductive fibers were observed to occur.

EXAMPLE 7

Spun yarns (30 d) prepared from a fiber mixture consisting of 15% by weight of cut stainless steel fibers (fiber diameter: 12 μm) and 85% by weight of cut polypropylene fibers (fiber diameter: 2 d) were woven to obtain an electroconductive woven fabric (60 warp yarns/in and 52 weft yarns/in).

Next, polypropylene pellets obtained by blending a highly crystalline propylene homopolymer (isotactic pentad ratio (P): 0.968, melt flow rate (MFR): 0.53 g/10 min and high melt flow rate (HMFR): 23.5 g/10 min) with 1,3,5-trimethyl-2,4,6-tris(3,5-di-t-butyl-4-hydroxybenzyl)benzene (0.10% by weight), tetrakis[methylene(3,5-di-t-butyl-4-hydroxy-hydrocinnamate)]methane (0.10% by weight) and calcium stearate (0.05% by weight) were melt-kneaded by an extruder having a bore diameter of 65 mm and extruded through a T-die of 600 mm wide at a resin temperature of 240° C. in the form of film.

On both the surfaces of the resulting resin film was overlaid the above-mentioned electroconductive woven fabric, followed by contact-bonding the substrate to the electroconductive woven fabric by means of a pair of a touch roll (metal roll) of 200 mm in diameter in which hot water at 80° C. was passed and a chill roll (metal roll) of 500 mm in diameter to obtain an electroconductive polypropylene sheet of 1.0 mm thick. The sheet was then passed through between heated rolls heated to 160° C. As a result, the polypropylene fibers of the electroconductive woven fabric melted completely and the fabric was integrated with the polypropylene sheet as the substrate to obtain an electroconductive polypropylene sheet having stainless steel fibers alone reticularly fixed onto the surface thereof.

The surface resistivities of the electroconductive polypropylene sheet on both the surfaces thereof at that time were $10^4$ to $10^5\Omega/\square$.

Next, both the surfaces of the electroconductive polypropylene sheet were subjected to corona discharge treatment by means of a corona discharge treatment equipment for electroconductors in the atmosphere. Both the surfaces had a wetting tension of 41 dyne/cm. Further, the surface resistivities of the electroconductive polypropylene sheet after the discharge treatment on both the surfaces thereof were $10^4$ to $10^5\Omega/\square$, that is, entirely unchanged from those before the corona discharge treatment.

Further, as the curing composition, there was prepared a mixed composition consisting of a polyepoxy acrylate oligomer (42% by weight), 2-hydroxypropyl acrylate (55% by weight), a betaine surfactant (2% by weight) and a polymerization inhibitor (1% by weight).

The composition was applied onto the whole surface (one side surface) of the above electroconductive polypropylene sheet by means of a gravure roll, followed by irradiating electron beams by means of an electron curtain conveyor type electron beam irradiation equipment (ELECTRON EPZ-2 type) in $N_2$ atmosphere ($O_2$ concentration: 200 ppm) at an accelerated voltage of 140 KV and in an amount of radiation of 6M rad to form a crosslinked and cured coating of 3 μm thick.

Similarly, a crosslinked and cured coating of 3 μm was formed on the other surface. No fluffing of electroconductive fibers was observed on both the surfaces, and even when the surfaces were strongly rubbed by cloth, nails, etc., no fluffing of electroconductive fibers occurred.

Further, the electroconductive polypropylene sheet after formation of the crosslinked and cured coating on both the surfaces had good electrical conductivity (surface resistivities: $10^4$ to $10^5\Omega/\square$).

EXAMPLE 8

Spun yarns (15 d) prepared from a fiber mixture consisting of 20% by weight of cut carbon-coated polyester fibers (fiber diameter: 3 d) and 80% by weight of cut polyvinyl chloride fibers (Teviron) were woven to obtain an electroconductive woven-fabric (115 warp yarns/in and 114 weft yarns/in).

Next, a polyvinyl chloride compound consisting of a polyvinyl chloride having an average polymerization degree of 1,300 (100 parts by weight), dioctyl phthalate (3.0 parts by weight), a dibutyltin alkyl maleate (2.5 parts by weight), butyl stearate (0.5 part by weight), stearyl alcohol (0.4 part by weight) and stearic acid (0.1 part by weight) was melt-kneaded by means of an extruder having a bore diameter of 65 mm and extruded through a T-die of 500 mm wide at a resin temperature of 185° C. in the form of film.

On both the surfaces of the resulting resin film was overlaid the above-mentioned electroconductive woven fabric, followed by contact-bonding the substrate to the electroconductive woven fabric by means of a pair of a touch roll (metal roll) of 200 mm in diameter in which hot water at 70° C. was passed and a chill roll (metal roll) to obtain an electroconductive polyvinyl chloride sheet of 0.7 mm thick. The sheet was then passed through between heated rolls heated to 170° C. As a result, the polyvinyl chloride fibers in the electroconductive woven-fabric melted completely and was integrated with the polyvinyl chloride sheet as a substrate to have carbon-coated polyester fibers alone adhered tightly onto the surface thereof in a reticular form. Both the surfaces of the electroconductive polyvinyl chloride sheet at that time had a surface resistivity of $10^6 \Omega/\square$.

Next, both the surfaces of the electroconductive polyvinyl chloride sheet were subjected to corona discharge treatment by means of a corona discharge treatment equipment for electroconductors in the atmosphere. Both the surfaces had a wetting tension of 43 dyne/cm. Further, the surface resistivities of the electroconductive polyvinyl chloride sheet after the corona discharge treatment on both the surfaces thereof were $10^6 \Omega/\square$, that is, entirely unchanged from those before the corona discharge treatment.

Further, as the curing composition, there was prepared a mixed composition consisting of a polyurethane acrylate oligomer (48% by weight), neopentyl glycol diacrylate (45% by weight), an extender pigment (alumina white) (6% by weight) and a polymerization inhibitor (1% by weight).

This composition was applied onto the surface (one side surface) of the above electroconductive polyvinyl chloride sheet by means of a gravure roll with a half tone screen (the area of the reticulate points: 60%), followed by irradiating electron beams by means of an electron curtain conveyor type electron beam irradiation equipment (EPZ-2 type) in $N_2$ atmosphere ($O_2$ concentration:-200 ppm) at an accelerated voltage of 160 KV and in an amount of radiation of 12M rad to form a crosslinked and cured coating of 7 μm thick. Similarly, a crosslinked and cured coating of 7 μm thick was formed on the other surface.

No fluffing cf the electroconductive fibers was observed on both the surfaces, and even when the surfaces were strongly rubbed, no fluffing of electroconductive fibers occurred.

Further, the electroconductive polyvinyl chloride sheet after formation of the crosslinked and cured coating on both the surfaces had a good electrical conductivity (surface resistivity: $10^6 \Omega/\square$).

EXAMPLE 9

Spun yarns (15 d) prepared from a fiber mixture consisting of 90% by weight of cut acrylonitrile-vinyl chloride copolymer fibers (Kanekaron SB) (fiber diameter: 1.5 d) and 10% by weight of cut austenite steel fibers (Naslon) (fiber diameter: 8 μm) were knitted to obtain an electroconductive knitted fabric having a basis weight of 80 g/m².

Next, a GP-PS resin (ESTYRENE G32) was melt-kneaded by means of an extruder having a bore diameter of 40 mm and extruded through a T-die of 300 mm wide at a resin temperature of 230° C. in the form of film. On one side surface of the resulting film was overlaid the above-mentioned electroconductive knitted fabric, followed by contact-bonding the substrate to the electroconductive knitted fabric by means of a pair of polishing rolls (metal rolls) in which hot water at 60° C. was passed, to obtain an electroconductive polystyrene sheet of 0.6 mm thick.

The sheet was then passed through between heated rolls heated to 180° C. As a result, the acrylonitrile-vinyl chloride copolymer fibers in the electroconductive knitted fabric melted completely and were integrated with the polystyrene sheet as the substrate to have the stainless steel fibers alone adhered tightly onto the surface. The surface resistivity of the surface of the electroconductive knitted fabric laminated onto the sheet was $10^5 \Omega/\square$.

Next, the surface of the electroconductive knitted fabric laminated onto the electroconductive polystyrene sheet was subjected to corona discharge treatment by means of a corona discharge treatment equipment for electroconductors. The wetting tension of the treated surface was 39 dyne/cm. Further, the surface resistivities of the electrodocnductive knitted fabric laminated onto the electroconductive polystyrene sheet were $10^5 \Omega/\square$, that is, entirely unchanged from those before the corona discharge treatment. Further, as the curing composition, there was prepared a mixed composition consisting of a polyurethane acrylate oligomer (48% by weight), neopentyl glycol diacrylate (45% by weight), an extender pigment (alumina white) (6% by weight) and a polymerization inhibitor (1% by weight).

The composition was applied onto the whole surface of the electroconductive knitted fabric laminated onto the electroconductive polystyrene sheet by means of a gravule roll, followed by irradiating electron beams by means of an electron curtain conveyor type electron beam irradiation equipment (ELECTRON EPZ-2 type) in $N_2$ atmosphere ($O_2$ concentration: 150 ppm) at an accelerated voltage of 140 KV and in an amount of radiation of 6M rad to form a cross-linked and cured coating of 5 μm thick.

No fluffing of electroconductive fibers was observed on the surface of the laminated electroconductive knitted fabric having a crosslinked and cured coating formed thereon, and even when the surface was strongly rubbed by means of cloth, nails, etc., no fluffying of electroconductive fibers occurred. Further, the surface had a good electrical conductivity (surface resistivity: $10^5$ to $10^6 \Omega/\square$).

EXAMPLE 10

Spun yarns (20 d) prepared from a fiber mixture consisting of 92% by weight of cut acrylonitrile-vinyl chloride copolymer fibers (Kanekaron) (fiber diameter: 3 d) and 8% by weight of aluminum-deposited polyester fibers (fiber diameter: 3 d) were knitted to obtain an electroconductive knitted fabric having a basis weight of 120 g/².

Next, an ABS resin was melt-kneaded by means of an extruder having a bore diameter of 40 mm and extruded through a T die of 300 mm wide at a resin temperature of 250° C. in the form of film. On both the surfaces of the resulting resin film was overlaid the above-mentioned electroconductive knitted fabric, followed by contact-bonding the substrate to the electroconductive knitted fabric by means of a pair of polishing rolls (metal rolls) in which hot water at 80° C. was passed, to obtain an electroconductive ABS resin sheet of 1.2 mm thick.

The sheet was then passed through between heated rolls heated to 180° C. As a result, the acrylonitrile-vinyl chloride copolymer fibers in the electroconductive knitted fabric melted completely and were integrated with the ABS resin sheet as the substrate to have the aluminum-deposited polyester fibers alone adhered tightly onto the surface in reticular form. The surface resistivity of the electroconductive knitted fabric laminated onto the sheet was $10^5 \Omega/\square$.

Next, both the surfaces of the electroconductive ABS resin sheet were subjected to corona discharge treatment by means of a corona discharge treatment equipment for electronconductors in the atmosphere. The wetting tensions of the treated surfaces were both 40 dyne/cm. The surface resistivities of the electroconductive ABS resin sheet after the corona discharge treatment on both the surfaces were $10^5 \Omega/\square$, that is, utterly unchanged from those before the corona discharge treatment.

Further, as the curing composition, there was prepared a mixed composition consisting of a polyepoxy acrylate oligomer (54% by weight), 2-hydroxyethyl acrylate (45% by weight) and a polymerization inhibitor (1% by weight).

The composition was applied onto the whole surface (one side surface) of the electroconductive knitted fabric laminated onto the electroconductive ABS resin sheet by means of a gravure roll, followed by irradiating electron beams by means of an electron curtain conveyor type electron irradiation equipment (ELECTRON EPZ-2 type) in $N_2$ atmosphere ($O_2$ concentration: 200 ppm) at an accelerated voltage of 140 KV and in an amount of radiation of 6M rad to form a rrosslinked and cured coating of 3 μm thick. Similarly a crosslinked and cured coating of 3 μm thick was formed on the other surface. No fluffing of electroconductive fibers was observed on both the surfaces of the electroconductive ABS resin sheet having the crosslinked and cured coating formed thereon, and even when the surfaces were strongly rubbed by cloth, nails, etc., no fluffing of electroconductive fibers occurred. Further the surfaces had a good electrical conductivity (surface resistivity: $10^5$ to $10^6 \Omega/\square$).

EXAMPLE 11

As the curing composition, there was prepared a mixed composition consisting of a polyester polyacrylate (64% by weight), a polyol polyacrylate (30% by weight), trimethylolpropane triacrylate (5% by weight) and benzoyl peroxide (1% by weight).

The composition was applied onto one side surface of an electroconductive polypropylene sheet (subjected to corona discharge treatment), same as that used in Example 7, by means of a bar coater, followed by heat treating the resulting material in an oven at 130° C. for 5 minutes to form a crosslinked and cured coating of 7 μm thick. Similarly, a crosslinked and cured coating of 7 μm thick was formed on the other surface.

No fluffing of electroconductive fibers was observed on both the surfaces, and even when the surfaces were strongly rubbed by cloth, nails, etc., no fluffing of electroconductive fibers occurred.

Further, both the surfaces of the electroconductive polypropylene sheet after formation of the crosslinked and cured coating had a good electrical conductivity (surface resistivity: $10^4$ to $10^5 \Omega/\square$).

EXAMPLE 12

As the curing composition, there was prepared a mixed composition consisting of a polyester polyacrylate (43% by weight), a polyol polyacrylate (40% by weight), trimethylolpropane triacrylate (15% by weight) and benzil (2% by weight).

The composition was applied onto one side surface of an electroconductive polyvinyl chloride sheet (subjected to corona discharge treatment) same as that used in Example 8, by means of a bar coater, followed by irradiating ultraviolet rays to form a crosslinked and cured coating of 5 μm thick. Similarly, a crosslinked and cured coating of 5 μm thick was formed on the other surface.

No fluffing of electroconductive fibers was observed on both the surfaces, and even when the surfaces were strongly rubbed by cloth, nails, etc., no fluffing of electroconductive fibers occurred.

Further, both the surfaces of the electroconductive polyvinyl chloride sheet after formation of the crosslinked and cured coating had a good electrical conductivity (surface resistibility: $10^6 \Omega/\square$).

COMPARATIVE EXAMPLE 5

Example 7 was repeated except that the thickness of the crosslinked and cured coating in Example 7 was changed to 15 μm to obtain an electroconductive polypropylene sheet. No fluffing of electroconductive fibers was observed on both the surfaces of the sheet, and even when the surfaces were strongly rubbed by means of cloth, nails, etc., no fluffing of electroconductive fibers occurred.

However, the surface resistivities of the electroconductive polypropylene sheet after formation of the crosslinked and cured coating on both the surfaces were far inferior ($10^{12} \Omega/\square$); hence the sheet was difficultly regarded as electroconductive sheet.

COMPARATIVE EXAMPLE 6

An electroconductive polypropylene sheet in a state where the crosslinked and cured coating in Example 7 was not formed was prepared and when its surface resistivities were measured, the surface resistivities on both the surfaces were as good as $10^4$ to $10^5 \Omega/\square$, but when the surfaces were strongly rubbed, fluffing of electroconductive fibers occurred.

COMPARATIVE EXAMPLE 7

Example 8 was repeated except that the coating thickness in Example 8 was changed to 15 μm to obtain an electroconductive polyvinyl chloride sheet. No fluffing of electroconductive fibers was observed on both the surfaces of the sheet and even when the surfaces were strongly rubbed, no fluffing of electroconductive fibers occurred.

However, the surface resistivities of the electroconductive polyvinyl chloride sheet after formation of the crosslinked and cured coating, on both the surfaces were far inferior ($10^{12} \Omega/\square$); hence the sheet was difficultly regarded as electroconductive thermoplastic resin sheet.

COMPARATIVE EXAMPLE 8

An electroconductive polyvinyl chloride sheet in a state where the crosslinked and cured coating in Example 8 was not formed was prepared and its surface resistivities were measured. As a result, the surface resistivities were as good as $10^6 \Omega/\square$ on both the surfaces, but when the surfaces were strongly rubbed, fluffing of electroconductive fibers occurred.

According to the present invention, by forming a crosslinked and cured coating of 1 to 10 μm thic tightly adhered onto an electroconductive thermoplastic resin sheet as a substrate sheet, it has possible to completely inhibit fluffing of electroconductive fibers while retaining good electroconductive properties and also to prevent deterioration of the appearance due to fluffing of electroconductive fibers as well as contamination of environment and deterioration of electrical conductivity due to falling off of electroconductive fibers.

Thus it is possible to suitably use the electroconductive thermoplastic resin sheet of the present invention alone or in combination with other materials in composite manner for packaging semiconductors of IC, LSI, etc., electronic parts, parts of precision machines, etc., and also as materials for clean room.

What we claim is:

1. An electroconductive thermoplastic resin sheet comprising a thermoplastic resin film;
   a non-woven fabric consisting of hot-melt-adhesive fibers and electroconductive fibers irregularly entangled with each other and applied and integrally melt-adhered onto one surface or both the surfaces of said film and then subjected to surface treatment; and
   a coating having a curing composition composed mainly of an unsaturated resin and a reactive diluent applied onto the treated surface and crosslinked and cured and having a coating thickness of 1 to 10 μm.

2. An electroconductive thermoplastic resin sheet according to claim 1 wherein said surface treatment is corona discharge treatment.

3. An electroconductive thermoplastic resin sheet according to claim 1, wherein said curing of said curing composition is carried out by means of electron beams.

4. An electroconductive thermoplastic resin sheet according to claim 1 wherein said electroconductive fibers are carbon fibers, stainless steel fibers, carbon composite synthetic fibers, carbon-coated synthetic fibers, aluminum or aluminum alloy fibers, aluminum-coated synthetic fibers, aluminum-coated carbon fibers or mixtures of at least two members of the foregoing.

5. An electroconductive thermoplastic resin sheet comprising
   a thermoplastic resin film;
   a knitted or woven fabric consisting of hot-melt-adhesive fibers and electroconductive fibers and applied and integrally melt-adhered onto one surface or both the surfaces of said thermoplastic resin film and subjected to surface treatment; and
   a coating having a curing composition composed mainly of an unsaturated resin and a reactive diluent applied onto the treated surface and crosslinked and cured and having a coating thickness of 1 to 10 μm.

6. An electroconductive thermoplastic resin sheet according to claim 5 wherein said surface treatment is corona discharge treatment.

7. An electroconductive thermoplastic resin sheet according to claim 5 wherein said curing means is electron beams.

8. An electroconductive thermoplastic resin sheet according to claim 5 wherein said electroconductive fibers are carbon fibers, stainless steel fibers, carbon composite synthetic fibers, carbon-coated synthetic fibers, aluminum or aluminum alloy fibers, aluminum-coated synthetic fibers, aluminum-coated carbon fibers or mixtures of at least two members of the foregoing.

* * * * *